United States Patent
Oftedahl

(10) Patent No.: US 12,479,545 B2
(45) Date of Patent: Nov. 25, 2025

(54) MONITORING MODULE

(71) Applicant: Jotun A/S, Sandefjord (NO)

(72) Inventor: Geir Axel Oftedahl, Sandefjord (NO)

(73) Assignee: Jotun A/S, Sandefjord (NO)

( * ) Notice: Subject to any disclaimer, the term of this patent is extended or adjusted under 35 U.S.C. 154(b) by 408 days.

(21) Appl. No.: 17/601,844

(22) PCT Filed: Mar. 24, 2020

(86) PCT No.: PCT/EP2020/058232
§ 371 (c)(1),
(2) Date: Oct. 6, 2021

(87) PCT Pub. No.: WO2020/207792
PCT Pub. Date: Oct. 15, 2020

(65) Prior Publication Data
US 2022/0204145 A1    Jun. 30, 2022

(30) Foreign Application Priority Data

Apr. 10, 2019  (GB) ..................... 1905103

(51) Int. Cl.
*B63B 59/10*    (2006.01)
*B25J 5/00*    (2006.01)
(Continued)

(52) U.S. Cl.
CPC .............. *B63B 59/10* (2013.01); *B25J 5/007* (2013.01); *B25J 9/1664* (2013.01);
(Continued)

(58) Field of Classification Search
None
See application file for complete search history.

(56) References Cited

U.S. PATENT DOCUMENTS 6,469,664 B1 * 10/2002  Michaelson ........... G01C 21/22
                                                                367/909
8,506,719 B2 *  8/2013  Holappa ..................... B08B 1/30
                                                                134/6
(Continued)

FOREIGN PATENT DOCUMENTS

CN    1853875 A    11/2006
CN    102224067 A    10/2011
(Continued)

OTHER PUBLICATIONS

PCT International Search Report & Written Opinion for corresponding PCT Application No. PCT/EP2020/058232, mailed on Jul. 1, 2020, 12 pages.
(Continued)

*Primary Examiner* — Erin D Bishop
*Assistant Examiner* — Mahmoud M Kazimi
(74) *Attorney, Agent, or Firm* — Dority & Manning, P.A.

(57) ABSTRACT

A method of controlling a robot configured to clean a hull of a vessel whilst traveling over said hull, the method comprising: receiving input data; during cleaning being performed by the robot, detecting that said cleaning being performed by the robot is to be paused based on determining, from the input data, that the robot is at risk of damage; and in response to said detecting that cleaning being performed by the robot is to be paused, outputting a pause cleaning signal indicating that said cleaning is to be paused.

19 Claims, 6 Drawing Sheets

(51) Int. Cl.
  *B25J 9/16* (2006.01)
  *B25J 11/00* (2006.01)
  *B25J 19/00* (2006.01)
  *G05D 1/617* (2024.01)
  *G05D 1/648* (2024.01)

(52) U.S. Cl.
  CPC ....... *B25J 11/0085* (2013.01); *B25J 19/0075* (2013.01); *G05D 1/617* (2024.01); *G05D 1/648* (2024.01)

(56) References Cited

U.S. PATENT DOCUMENTS

| | | | |
|---|---|---|---|
| 9,038,557 B2 | 5/2015 | Smith | |
| 9,545,965 B2* | 1/2017 | Schlee | B60B 39/00 |
| 11,047,146 B2* | 6/2021 | Leonessa | G01C 15/002 |
| 2011/0282536 A1 | 11/2011 | Rooney | |
| 2012/0109376 A1* | 5/2012 | Lee | G05D 1/0246 |
| | | | 700/258 |
| 2014/0076223 A1* | 3/2014 | Smith | B62D 55/32 |
| | | | 114/221 R |
| 2017/0247086 A1* | 8/2017 | Pyörre | B63B 49/00 |
| 2018/0311822 A1* | 11/2018 | Kaminka | B25J 9/1682 |
| 2022/0204145 A1 | 6/2022 | Oftedahl | |

FOREIGN PATENT DOCUMENTS

| | | | | |
|---|---|---|---|---|
| CN | 105792720 A | 7/2016 | | |
| CN | 107092259 A | 8/2017 | | |
| CN | 107744371 A | 3/2018 | | |
| CN | 109263828 A | 1/2019 | | |
| EP | 3076845 B1 * | 2/2019 | .......... | A47L 11/4011 |
| GB | 2471204 | 12/2010 | | |
| JP | H09216184 A | 8/1997 | | |
| JP | 2018535837 A | 12/2018 | | |
| KR | 20160029886 A | 3/2016 | | |
| KR | 20160099965 A | 8/2016 | | |
| WO | WO 2014/043395 | 3/2014 | | |
| WO | WO 2014/043411 | 3/2014 | | |
| WO | WO 2014/072556 | 5/2014 | | |
| WO | WO2017072771 A | 5/2017 | | |
| WO | WO 2018/130905 | 7/2018 | | |

OTHER PUBLICATIONS

GB Office Action for corresponding Application No. GB1905103.6, dated Oct. 4, 2019, 3 pages.
Japanese Office Action for corresponding Application No. 2021-559850, mailed Mar. 5, 2024, 2 pages.
English translation of the Japanese Office Action for corresponding Application No. 2021-559850, mailed Nov. 7, 2023, 5 pages.
Chinese Office Action (w/ English translation) for corresponding Application No. 202080027820.3, dated May 24, 2024, 25 pages.

* cited by examiner

MONITORING MODULE

CROSS-REFERENCE TO RELATED APPLICATIONS

This application is a U.S. national phase entry of International Application number PCT/EP2020/058232 filed on Mar. 24, 2020, which, in turn, is based upon and claims the benefit of priority from prior United Kingdom Application number 1905103.6 filed on Apr. 10, 2019, the entire contents of both of which are incorporated herein by reference.

TECHNICAL FIELD

The present disclosure relates to a monitoring module. In particular, the present disclosure relates to a monitoring module for controlling a robot that is configured to clean a hull of a vessel whilst travelling over the hull.

BACKGROUND

All surfaces submerged in seawater will experience fouling of organisms such as bacteria, diatoms, algae, mussels, tube worms and barnacles. Marine fouling is the undesirable accumulation of microorganisms, algae and animals on structures submerged in seawater. The fouling organisms can be divided into microfoulers (bacterial and diatomic biofilms) and macrofoulers (e.g. macroalgae, barnacles, mussels, tubeworms, bryozoans) which live together forming a fouling community. In a simplistic overview of the fouling process, the first step is the development of a conditioning film where organic molecules adhere to the surface. This happens instantaneously when a surface is submerged in seawater. The primary colonizers, the bacteria and diatoms, will settle within a day. The secondary colonizers, spores of macroalgae and protozoa, will settle within a week. Finally, the tertiary colonizers, the larvae of macrofoulers, will settle within 2-3 weeks.

The prevention of marine fouling is a known problem. Fouling of the hull of a vessel will lead to increased drag resistance and increased fuel consumption or reduced speed. Increased fuel consumption will lead to increased $CO_2$, $NO_x$ and sulphur emissions. Heavy fouling can also lead to reduced manoeuvrability of the vessel. Many commercial vessels (e.g. container ships, bulk carriers, tankers, passenger ships) are trading worldwide. If the hull of a vessel is fouled the organisms will be transported from its original ecosystem to a different ecosystem. This is problematic as new species can be introduced in sensitive ecosystems and eliminate indigenous species.

Traditionally, antifouling coatings have been used to prevent the settlement and growth of marine organisms. The most efficient antifouling coatings contain biocides that will leak out from the coating film and thereby reduce the amount of fouling.

Robots, sometimes phrased as "crawlers" or ROVs (remotely operated vehicles), have also previously been used for cleaning of surfaces submerged in water e.g. for use on ship's hulls. Background art can be found in WO2014043411, U.S. Pat. No. 8,506,719, and WO2014043395.

SUMMARY

The inventors have identified that the application of antifouling coatings to a vessel has limitations. In particular, commercial vessels often operate in different waters, in different trade, with different activity, including idle periods. The risk of fouling is higher when objects are stationary or at low speed as the organisms have longer time to settle on the surface. Typical service intervals for commercial vessels are from 24 to 90 months. When the vessel is going into dry-dock for service and repair, the antifouling coating is usually specified according to the planned trade for the next period. However, the trade of a vessel can change during the service interval. It is therefore difficult to design and specify an antifouling coating that will be optimal for all possible situations. The use of biocides is highly regulated. In certain harbors where the water circulation is low there are also restrictions on the use of biocide containing antifouling coatings as the biocide concentration accumulates.

The inventors have also identified that whilst robots have previously been used for cleaning of surfaces submerged in water, the cleaning process has been either manually initiated, determined according to a predefined frequency or triggered by fouling of the vessel (for example increased chlorophyll level measured by the robot). These techniques can lead to damage to the robot itself and/or objects in the robot's environment, for example people, objects on shore (e.g. locks) or the vessel itself.

In embodiments of the present disclosure, to reduce the amount of fouling on the hull of a vessel, continuous cleaning is performed by a robot whilst travelling over the vessel. If it is detected that the robot is not capable of operating safely, cleaning performed by the robot is paused.

Due to the fact that the robot performs cleaning of the hull of the vessel only when conditions are conducive for cleaning, embodiments of the present disclosure advantageously enable the use of the robot without using any wire or other tethering between the robot and the docking station (or other part of the vessel), which may otherwise be needed to prevent the robot from becoming detached from the vessel and lost.

According to one aspect of the present disclosure there is provided a method of controlling a robot configured to clean a hull of a vessel whilst travelling over said hull, the method comprising: receiving input data; during cleaning being performed by the robot, detecting that said cleaning being performed by the robot is to be paused based on determining, from the input data, that the robot is at risk of damage; and in response to said detecting that cleaning being performed by the robot is to be paused, outputting a pause cleaning signal indicating that said cleaning is to be paused.

The input data may comprise location information defining a geographical location of the vessel and the method comprises determining that the robot is at risk of damage based on the location information.

The method may comprise: querying a geographical model with the geographical location of the vessel; and determining that the robot is at risk of damage based on the geographical model defining that no cleaning is to be performed at said geographical location of the vessel.

The input data may comprise location information defining a location of the robot on the hull of the vessel, and the method may comprise: determining, whilst the vessel is stationary, that the vessel will start to move within a predetermined time period; and determining that the robot is at risk of damage based on the location of the robot on the hull of the vessel and said determining that the vessel will start to move within the predetermined time period.

The input data may comprise an indication that an anchor of the vessel is in a raised state, and the determining that the vessel will start to move within the predetermined time period may be based on said indication.

The input data may comprise vibration data indicative of an operating state of an engine of the vessel, and said determining that the vessel will start to move within the predetermined time period may be based on said vibration data.

The location information may be received from a location sensor located on the robot or on the vessel.

The location information may be received from a remote computing device external to said robot.

The input data may comprise environmental data relating to an environment of the vessel, and the method may comprise determining that the robot is at risk of damage based on the environmental data.

The environmental data may comprise a speed of currents in an aquatic environment of the vessel, and the method may comprise determining that the robot is at risk of damage based on the speed of the currents exceeding a predetermined aquatic current threshold.

The environmental data may comprise a temperature, and the method may comprise determining that the robot is at risk of damage based on the temperature being below a predetermined temperature threshold.

The environmental data may comprise a temperature, and the method may comprise determining that the robot is at risk of damage based on the temperature being above a predetermined temperature threshold.

The environmental data may comprise wave information and the method may comprise determining that the robot is at risk of damage based on an average wave height exceeding a predetermined wave height threshold.

The environmental data may comprise a depth of water below the vessel, and the method may comprise determining that the robot is at risk of damage based on the depth being below a predetermined depth threshold.

The environmental data may be received from at least one of: one or more sensors on the robot; one or more sensors on the vessel; a remote computing device external to said robot; and a satellite.

Whilst said cleaning is paused, the robot may be configured to be stationary. Alternatively upon detecting that cleaning being performed by the robot is to be paused, the robot may be configured to move to a docking station on said vessel.

The method may further comprise: receiving further input data; whilst said cleaning is paused, detecting that cleaning performed by the robot is to be restarted based on determining, from the further input data, that the robot is no longer at risk of damage; and in response to said detecting that cleaning being performed by the robot is to be restarted, outputting a restart cleaning signal indicating that said cleaning is to be restarted.

The method may be performed by a monitoring module on said robot, and wherein upon detecting that cleaning being performed by the robot is to be paused, the method may comprise outputting the pause cleaning signal to a cleaning module on the robot to pause said cleaning; and upon detecting that cleaning performed by the robot is to be restarted, the method may comprise outputting a restart cleaning signal to the cleaning module on the robot to restart said cleaning.

The method may be performed by a monitoring module on said robot, and wherein upon detecting that cleaning being performed by the robot is to be paused, the method may comprise outputting the pause cleaning signal to a remote computing device external to said robot for validation by a user; and upon detecting that cleaning performed by the robot is to be restarted, the method may comprise outputting a restart cleaning signal to the remote computing device external to said robot for validation by the user.

The method may be performed by a monitoring module on a remote computing device external to said robot. In these embodiments, upon detecting that cleaning being performed by the robot is to be paused, the method may comprise automatically transmitting the pause cleaning signal to a cleaning module on the robot to pause said cleaning; and upon detecting that cleaning performed by the robot is to be restarted, the method may comprise automatically transmitting the restart cleaning signal to the cleaning module on the robot to restart said cleaning. Alternatively, upon detecting that cleaning being performed by the robot is to be paused, the method comprises outputting the pause cleaning signal to a user for validation before transmitting the pause cleaning signal to a cleaning module on the robot to pause said cleaning; and upon detecting that cleaning performed by the robot is to be restarted, the method comprises outputting the restart cleaning signal to a user for validation before transmitting the restart cleaning signal to the cleaning module on the robot to restart said cleaning.

According to another aspect of the present disclosure there is provided a computer-readable storage medium comprising instructions which, when executed by a processor of a device cause the device to perform the method steps described herein.

The device may correspond to the robot referred to herein or a computing device external to the robot (e.g. a computing device on a vessel in communication with the robot).

The instructions may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present disclosure there is provided a robot configured to clean a hull of a vessel whilst travelling over said hull, the robot comprising a processor configured to: receive input data; during cleaning being performed by the robot, detect that said cleaning being performed by the robot is to be paused based on determining, from the input data, that the robot is at risk of damage; and in response to said detecting that cleaning being performed by the robot is to be paused, output a pause cleaning signal indicating that said cleaning is to be paused.

The processor may be configured to output the pause cleaning signal to a cleaning module on the robot to pause said cleaning.

The processor may be configured to output the pause cleaning signal to a remote computing device external to said robot for validation by a user.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
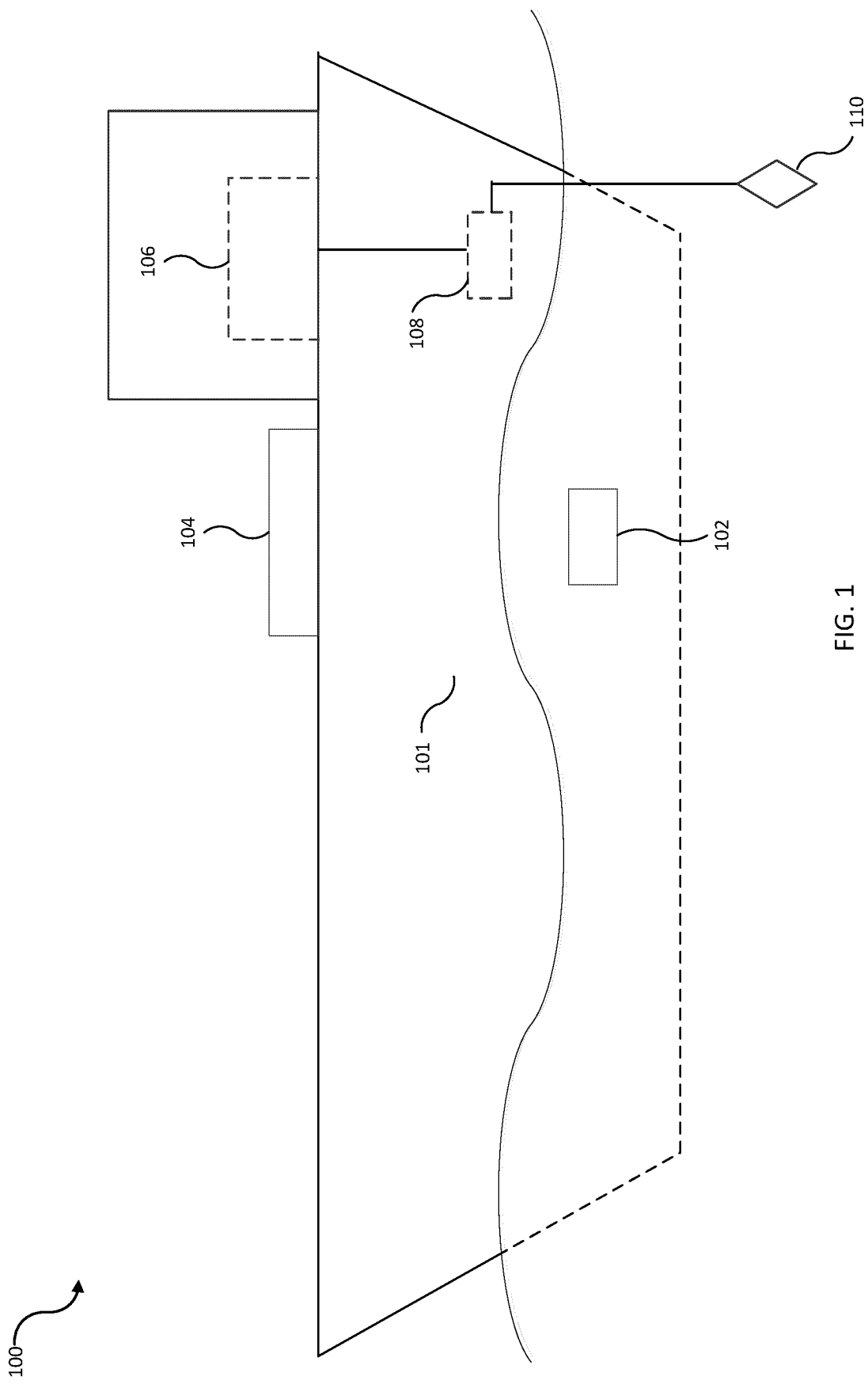
FIG. 1 illustrates a vessel and a robot.

FIG. 1 illustrates an aquatic vessel 100 for example a container ship, bulk carrier, tanker or passenger ship. The aquatic vessel comprises a hull 101.

Before operation, a robot 102 will be stationary at a robot station 104 (a docking station) which may be used to charge the robot 102. The robot station 104 will be positioned on the vessel above the sea level. In some embodiments of the present disclosure, the robot station 104 allows for parking of the robot 102 when cleaning operations performed by the robot are paused. During cleaning of the surface of the hull 101, the robot 102 may traverse any surface of the hull 101 where marine fouling may form (e.g. a flat bottom or side bottom of the hull).

As shown in FIG. 1 a computing device 106 may be provided in a deckhouse of the vessel for communication with the robot 102. Furthermore an anchor sensor 108 coupled to the anchor 110 of the vessel may be provided, the anchor sensor 108 being in communication with the computing device 106.

In embodiments of the present disclosure, a monitoring module is configured to control the cleaning of the hull 101 of the vessel 100 whilst the robot 102 travels over the hull 101. In contrast to known techniques, in embodiments described herein the default state of the robot 102 is to continuously clean the hull 101 and the cleaning operation is only paused when the robot 102 needs to recharge its power source (e.g. by returning to the robot station 104) or when it is unsafe for the robot to perform its cleaning.

The robot 102 may be at risk of damage when the vessel is located at a particular geographical location. For example, when travelling through narrow locks in a canal the robot 102 is at risk of damage caused by colliding with the locks. In another example, when travelling through waters with high levels of waste/contamination the robot 102 is at risk of damage caused by colliding with the waste/contamination.

The robot 102 may also be at risk of damage during certain environmental conditions. For example high currents in the water can cause the robot to become detached from the vessel and lost. In another example, high temperatures and/or intense sunlight can cause a metallic surface of the hull 101 to be in excess of 60° C. which may result in damage to components of the robot (e.g. wheel liners, brushes and batteries of the robot). In another example, low temperatures can lead to ice on the hull of the vessel, ice on the surface of the water or ice on the robot 102 which can be a risk for damaging the robot or causing the robot to become detached from the vessel and lost. In yet another example, high waves can be a risk for damaging the robot or causing the robot to become detached from the vessel and lost.

In embodiments of the present disclosure, during cleaning being performed by the robot, a monitoring module detects that the cleaning being performed by the robot is to be paused based on determining, from input data, that the robot is at risk of damage. In response to this detection, the monitoring module outputs a pause cleaning signal indicating that the cleaning is to be paused.

Reference to "cleaning" is used herein to refer to the removal of fouling organisms from the surface of the hull 101; such cleaning is sometimes referred to as "grooming" or "proactive cleaning". By performing the continual cleaning of the surface of the hull 101, the robot 102 typically performs removal of the initial conditioning film, where organic molecules have adhered to the surface of the hull 101, and/or primary colonizers and before secondary colonizers have had a chance to settle. However, it will be appreciated that the cleaning performed by the robot 102 may also involve removal of secondary colonizers and any subsequent colonizers.

The duration of a continuous cleaning operation performed by the robot 102 that is described herein may vary. A continuous cleaning operation may be continual in that the cleaning is only paused when the robot returns to the docking station 104 to be recharged. Alternatively the continuous cleaning operation may have a set duration after which the robot returns to the docking station 104 before commencing a new continuous cleaning operation. If for example the vessel is idle for 1 week and the robot has spent half a day cleaning the hull it might not be necessary for the robot to continue to clean the hull for the rest of the day. The continuous cleaning operation can thus end and the robot can then start a new continuous cleaning operation again the next day (e.g. to reduce the wear of the robot).

Whilst FIG. 1 illustrates a single robot 102 on the vessel for simplicity, it will be appreciated that there may be multiple robots on the vessel. Similarly, whilst a single robot station 104 is shown in FIG. 1, it will be appreciated that there may be multiple robot stations on the vessel.

Figure 2:
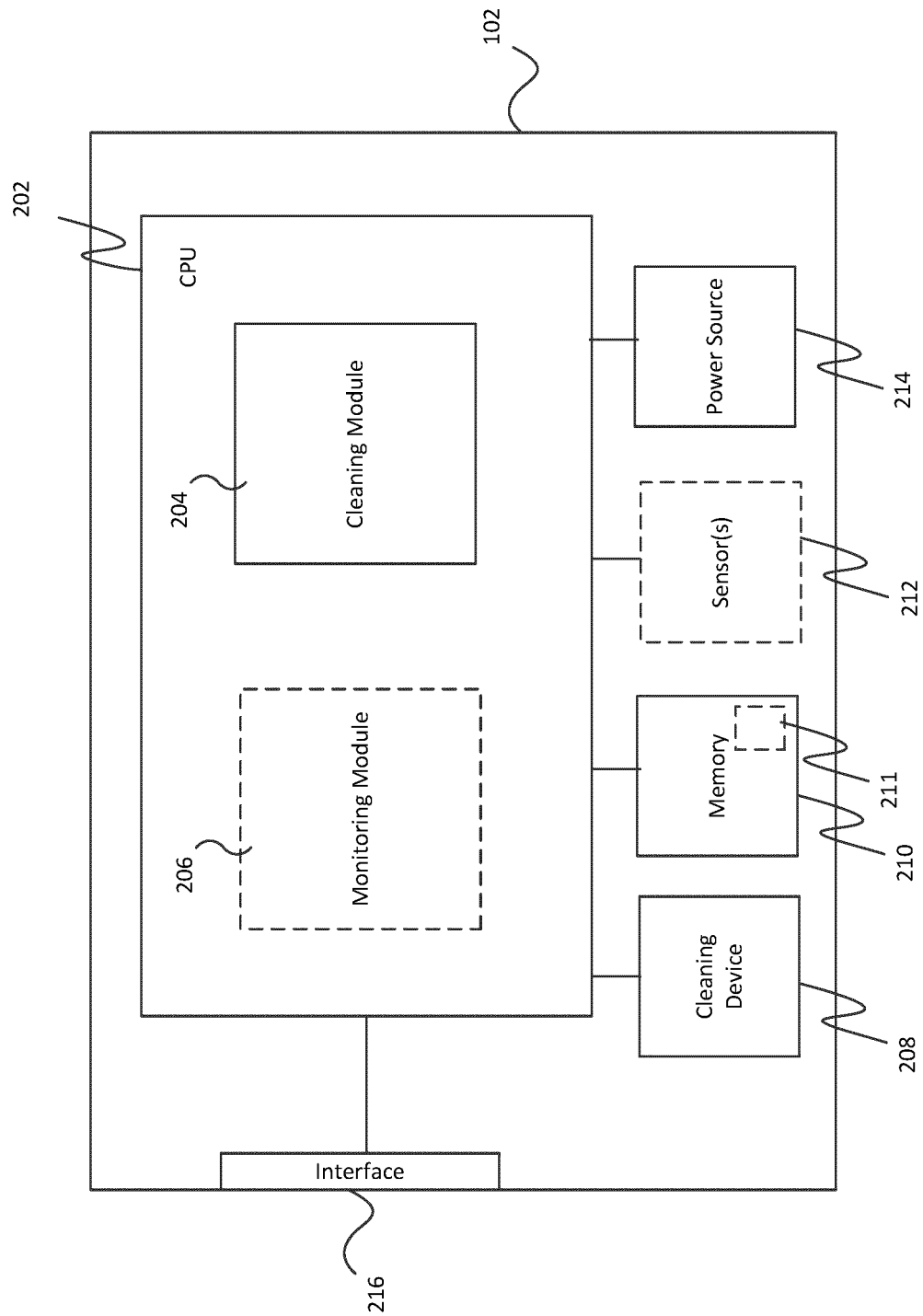
FIG. 2 is a schematic block diagram of the robot.

FIG. 2 is a schematic block diagram of the robot 102. As shown in FIG. 2, the robot 102 comprises a central processing unit ("CPU") 202. The CPU 202 comprises a cleaning module 204 which is configured to control a cleaning device 208 (which may take the form of a rotary cylindrical brush) which is coupled to the CPU 202 and performs the removal of fouling organisms from the surface of the hull 101. The cleaning module 204 is configured to pause the cleaning being performed by the cleaning device 208 in response to receiving a pause cleaning signal. The cleaning module 204 is configured to restart the cleaning device 208 to perform cleaning in response to receiving a restart cleaning signal.

The CPU 202 may also comprise a monitoring module 206. It will be apparent from the below that whilst the robot 102 may comprise the monitoring module 206, in alternative embodiments (described in more detail below with reference to FIG. 3c) the monitoring module may be a component of the computing device 106.

The CPU 202 is coupled to a power source 214 (e.g. one or more battery). The power source 214 may be rechargeable e.g. using the robot station 104. The robot 102 also comprises a memory 210 for storing data as is known in the art. The memory 210 may comprise a geographical model 211, described in more detail later.

In some embodiments an interface 216 is provided to enable the robot 102 to receive and transmit data. The interface 216 may comprise a wired and/or a wireless interface.

As shown in FIG. 2, the robot 102 may comprise one or more sensor(s) 212 that are configured to output a sensor signal to the monitoring module 206. Each of the sensors described herein may be a physical sensor (i.e. a physical measurement instrument) or a virtual sensor (i.e. software that combines sensed data from multiple physical sensors to compute a measurement).

The sensor(s) 212 may comprise one or more location sensor configured to output location information. The location sensor(s) may sense a geographical location of the vessel 100 and/or a location of the robot 102 on the hull 101 of the vessel 100. The location sensor(s) may comprise a global positioning system (GPS) sensor and/or an Automatic Identification System (AIS) sensor. The location sensor(s) may employ other location techniques known to persons skilled in the art that are not described herein. The sensor(s) 212 may comprise a vibration sensor configured to output vibration data indicative of an operating state of an engine of the vessel. For example the engine of the vessel will generate varying degrees of vibration over the hull 101 based on the operating state of an engine of the vessel (e.g. whether the vessel is stationary with the engine off, stationary with the engine on and the vessel imminently about to begin a journey, travelling at low speed, travelling at high speed etc.)

The sensor(s) 212 may comprise the anchor sensor 108. The anchor sensor 108 is configured to output a sensor signal indicative of the anchor 110 of the vessel being in a raised (from which it can be inferred that the vessel is moving or is about to move) or lowered state (from which it can be inferred that the vessel is stationary or is about to stop).

The sensor(s) 212 may comprise one or more environment sensor configured to output environmental data relating to an environment of the vessel. The sensor(s) configured to output environmental data relating to an environment of the vessel may comprise one or more of: (i) an air temperature sensor configured to sense an air temperature, (ii) a water temperature sensor configured to sense a water temperature of the aquatic environment of the vessel; (iii) a wave sensor configured to sense the degree of waves in the aquatic environment of the vessel 100 and output wave information, (iv) a water current sensor configured to sense the degree of water currents in the aquatic environment of the vessel 100, and (v) a depth sensor configured to sense a depth of the aquatic environment of the vessel.

Whilst the sensor(s) 212 have been described as being located on the robot 102, the monitoring module 206 may receive the information provided by these sensors from additional or alternative sources.

For example, one or more of the sensor(s) 212 sensors may be located on the vessel 100 (for example on the docking station 104 or other location on the vessel 100).

The sensor(s) that are located on the vessel 100 which output sensor data may output the sensor data directly to the monitoring module 206 on the robot 102 via interface 216. Alternatively, the sensor(s) that are located on the vessel 100 may output the sensor data to the computing device 106 which relays the sensor data to the monitoring module 206 on the robot 102 via interface 216.

In other embodiments, sensor data may be received at the monitoring module 206 from a computing device remote from the vessel. For example, the sensor data may be received from a computing device on shore or in the waters e.g. from a computing device on a weather buoy or on a semi-submersible platform.

In another example, a computing device (e.g. on the vessel or on shore) may receive satellite data comprising location and/or environmental data from a satellite and supply the satellite data to the monitoring module 206.

In embodiments described in more detail below, the sensor data described above is used by the monitoring module 206 to determine whether or not the robot is at risk of damage and to control the cleaning performed by the cleaning module 204.

Figure 3A:
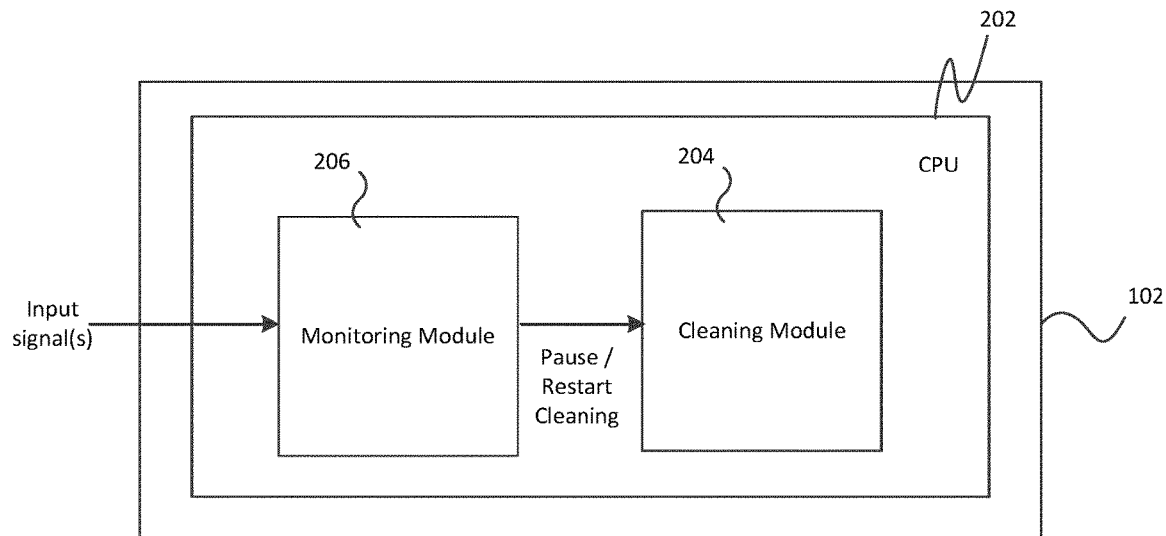
FIG. 3a illustrates a monitoring module and a cleaning module in accordance with one embodiment of the present disclosure.

FIG. 3a illustrates a monitoring module 206 and a cleaning module 204 in accordance with one embodiment of the present disclosure in which both the monitoring module 206 and the cleaning module 204 are located on the robot 102.

In the embodiment of FIG. 3a the monitoring module 206 is configured to communicate with the cleaning module 204.

In this embodiment, the monitoring module 206 is configured to receive input signals and based on these input signals the monitoring module 206 is configured to detect that cleaning being performed by the robot is to be paused and output a pause cleaning signal to the cleaning module 204 on the robot 102, and is further configured to detect that cleaning performed by the robot is to be restarted based on these input signals and output a restart cleaning signal to the cleaning module 204 on the robot 102.

In the embodiment of FIG. 3a, the monitoring module 206 uses the received input signals to determine whether or not the robot is at risk of damage. The input signals may be received from one or more of a sensor on the robot, a sensor on the vessel, or a remote computing device.

Figure 3B:
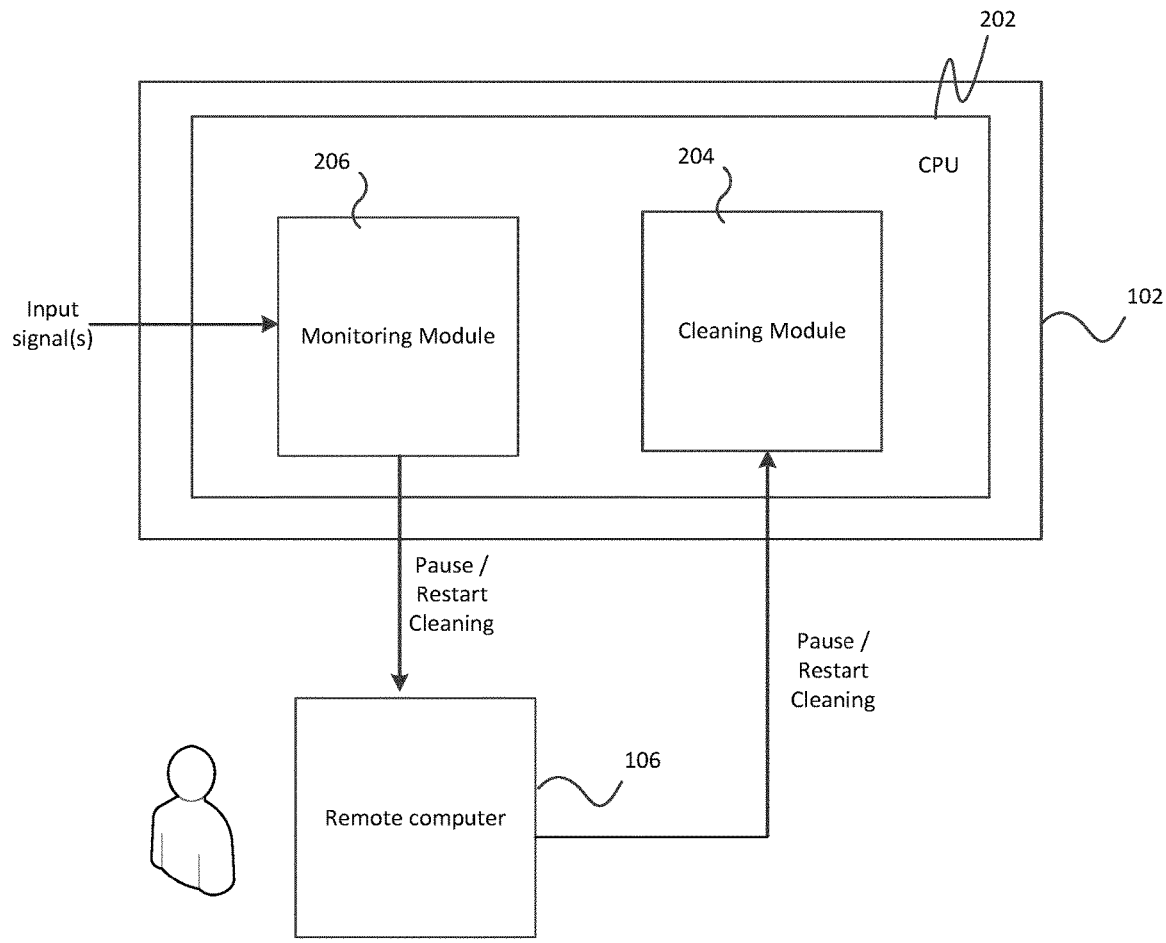
FIG. 3b illustrates the monitoring module and the cleaning module in accordance with another embodiment of the present disclosure.

FIG. 3b illustrates a monitoring module 206 and a cleaning module 204 in accordance with another embodiment of the present disclosure in which both the monitoring module 206 and the cleaning module 204 are located on the robot 102. However, in this embodiment, the monitoring module 206 is configured to communicate with the computing device 106 rather than the cleaning module 204 to provide for "man in the middle" functionality.

In this embodiment, the monitoring module 206 is configured to receive input signals and based on these input signals the monitoring module 206 is configured to detect that cleaning being performed by the robot is to be paused and output a pause cleaning signal to the remote computing device 106 for validation by a user of the remote computing device 106 (e.g. via a display on the remote computing device 106). If the user of the remote computing device 106 confirms that the cleaning being performed by the robot is to be paused (using an input device of the remote computing device 106), the user makes an appropriate input into the remote computing device 106 causing a pause cleaning signal to be output from the remote computing device 106 to the cleaning module 204 on the robot 102.

The monitoring module 206 is further configured to detect that cleaning performed by the robot is to be restarted based on these input signals and output a restart cleaning signal to the remote computing device 106 for validation by the user of the remote computing device 106. If the user of the remote computing device 106 confirms that the cleaning being performed by the robot is to be restarted, the user makes an appropriate input into the remote computing device 106 causing a restart cleaning signal to be output from the remote computing device 106 to the cleaning module 204 on the robot 102.

In the embodiment of FIG. 3b, the monitoring module 206 uses the received input signals to determine whether or not the robot is at risk of damage. The input signals may be received from one or more of a sensor on the robot, a sensor on the vessel, or a remote computing device.

Figure 3C:
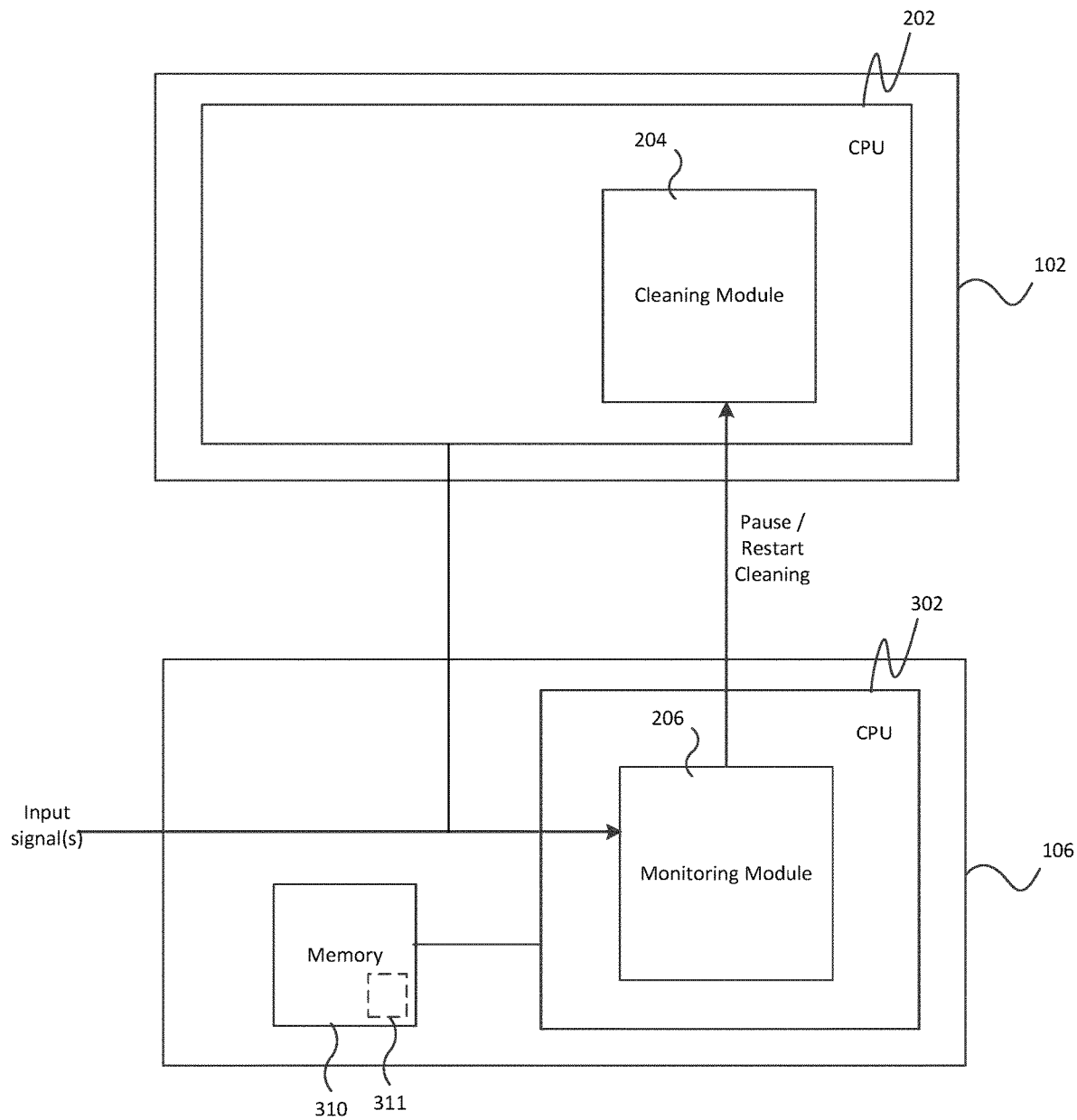
FIG. 3c illustrates the monitoring module and the cleaning module in accordance with yet another embodiment of the present disclosure.

FIG. 3c illustrates a monitoring module 206 and a cleaning module 204 in accordance with another embodiment of the present disclosure in which the cleaning module 204 is located on the robot 102 and the monitoring module 206 is located on the remote computing device 106.

As shown in FIG. 3c, the remote computing device 106 comprises a CPU 302 coupled to memory 310. The memory 310 may comprise a geographical model 311, described in more detail later. The CPU 302 comprises the monitoring module 206. In the embodiment of FIG. 3c the monitoring module 206 on the remote computing device 106 is configured to communicate with the cleaning module 204 on the robot 102.

In this embodiment, the monitoring module 206 is configured to receive input signals and based on these input signals the monitoring module 206 is configured to detect that cleaning being performed by the robot is to be paused. In response to detecting that cleaning being performed by the robot is to be paused, the monitoring module 206 may be configured to automatically transmit a pause cleaning signal to the cleaning module 204 on the robot 102 to pause the cleaning. Alternatively, in response to detecting that cleaning being performed by the robot is to be paused, the monitoring module 206 may be configured to output a pause cleaning signal for validation by the user of the remote computing device 106 (e.g. via a display on the remote computing device 106). If the user of the remote computing device 106 confirms that the cleaning being performed by the robot is to be paused the user makes an appropriate input into the remote computing device 106 causing a pause cleaning signal to be output from the remote computing device 106 to the cleaning module 204 on the robot 102.

The monitoring module 206 is further configured to detect that cleaning performed by the robot is to be restarted based on these input signals. In response to detecting that cleaning performed by the robot is to be restarted, the monitoring module 206 may be configured to automatically transmit the restart cleaning signal to the cleaning module 204 on the robot 102 to restart the cleaning.

Alternatively, in response to detecting that cleaning performed by the robot is to be restarted, the monitoring module 206 may be configured to output a restart cleaning signal for validation by the user of the remote computing device 106. If the user of the remote computing device 106 confirms that the cleaning being performed by the robot is to be restarted, the user makes an appropriate input into the remote computing device 106 causing a restart cleaning signal to be output from the remote computing device 106 to the cleaning module 204 on the robot 102.

In the embodiment of FIG. 3c, the monitoring module 206 uses the received input signals to determine whether or not the robot is at risk of damage. The input signals may be received from one or more of: a sensor on the robot, a sensor on the vessel, or a satellite.

Figure 4:
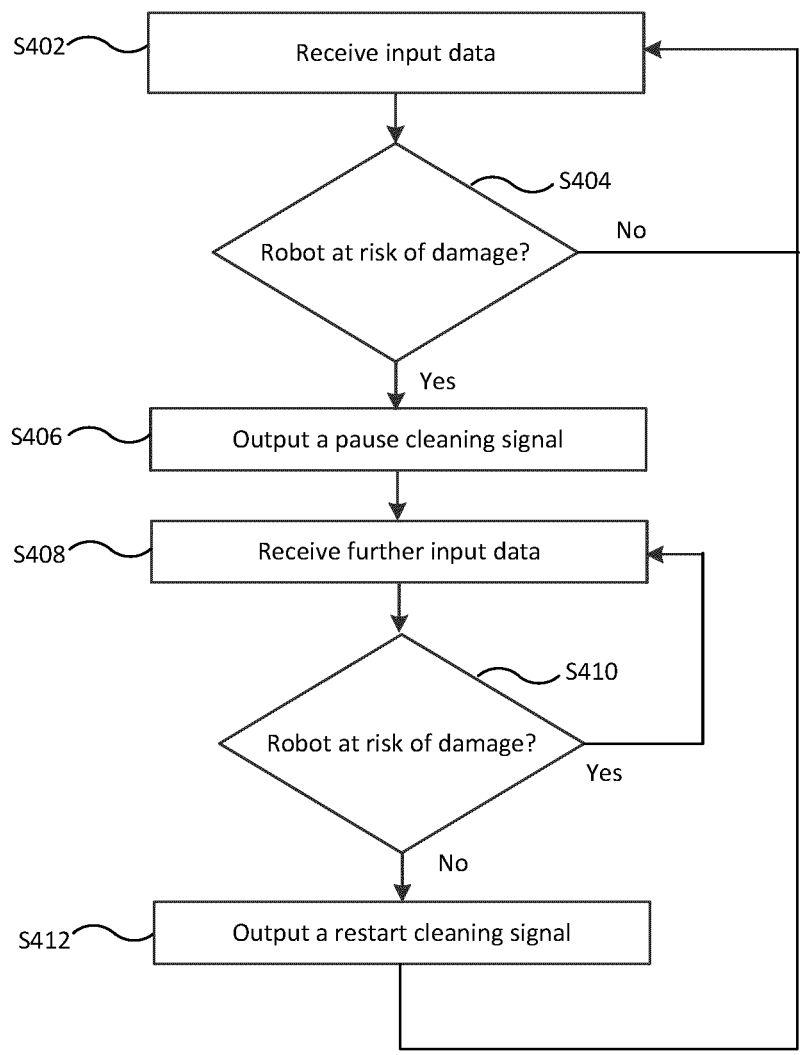
FIG. 4 illustrates a process of controlling the robot performed by the monitoring module.

FIG. 4 illustrates an example process 400 performed by the monitoring module 206 for controlling the robot.

As noted above, the default state of the robot 102 is to continuously clean the hull 101 whilst travelling over the hull 101. The monitoring module 206 is configured to perform process 400 once a continuous cleaning operation has begun.

At step S402 the monitoring module 206 receives input data. As noted above with reference to FIGS. 3a-c, the input data may be received from one or more sensor located on the robot 102, one or more sensor located on the vessel 100, a remote computing device or a satellite. As noted below, the input data can take various forms.

At S404, the monitoring module 206 determines if the robot is at risk of damage using the input data. This determination can be performed in various ways which are described in more detail below.

If the monitoring module 206 determines that the robot is not at risk of damage, the robot 102 continues to clean the hull 101 of the vessel 100 and the process 400 returns to step S402.

If the monitoring module 206 determines that the robot is at risk of damage, the process 400 proceeds to step S406 where the monitoring module 206 outputs a pause cleaning signal.

In the embodiments of FIGS. 3a and 3c, the pause cleaning signal is output from the monitoring module 206 to the cleaning module 204 on the robot 102. In the embodiment of FIG. 3b, the pause cleaning signal is output from the monitoring module 206 to the computing device 106.

In response to receiving the pause cleaning signal, the cleaning module 204 is configured to pause the cleaning being performed by the cleaning device 208 by communicating with the cleaning device 208.

When the continuous cleaning is paused, the robot may be configured to remain stationary at its current position on the hull of the vessel. Alternatively, upon detecting that cleaning being performed by the robot is to be paused, the robot may be configured to move to the docking station 104 or other location on the vessel designated as being a safe location whereby the robot will not be damaged or lost during high speed.

Whilst the continuous cleaning is paused, the monitoring module 206 receives further input data at step S408.

At S410, the monitoring module 206 determines if the robot is still at risk of damage using the further input data. If the monitoring module 206 determines at step S410 that the robot is still at risk of damage then the cleaning is not restarted.

If the monitoring module 206 determines at step S410 that the robot is no longer at risk of damage, then the process 400 proceeds to step S412 where the monitoring module 206 outputs a restart cleaning signal indicating that continuous cleaning by the robot is to be restarted.

In the embodiments of FIGS. 3a and 3c, the restart cleaning signal is output from the monitoring module 206 to the cleaning module 204 on the robot 102. In the embodiment of FIG. 3b, the restart cleaning signal is output from the monitoring module 206 to the computing device 106. After step S412 the process 400 returns to step S402.

By combining the robot 102 capable of cleaning together with the monitoring module 206, the robot will clean when it is safe and the robot is not at risk of damage. The process 400 provides an efficient and safe method to reduce the amount of fouling on the hull of a vessel.

As noted above, the determination at steps S404 and S410 can be performed using various methods described below. These methods may be used independently from each other or in any combination. The frequency by which steps S404 and S410 are performed may be constant. Alternatively the frequency by which steps S404 and S410 are performed may not be constant—taking step S404 as an example, the frequency by which step S404 is performed may increase over time when approaching the condition that defines that the robot is at risk of damage.

In a first method, at step S402 and S408 the monitoring module 206 receives location information defining a geographical location of the vessel, and at step S404 and step S410 the monitoring module 206 determines whether the robot is at risk of damage based on the location information.

At step S404 and S410, the monitoring module 206 queries a geographical model 211, 311 with the geographical location of the vessel to determine whether the robot is at risk of damage. The geographical model may be stored in memory 210 (in embodiments of FIGS. 3a and 3b) or in memory 310 (in the embodiment of FIG. 3c).

The geographical model 211,311 defines for each of a plurality of aquatic regions on Earth whether or not cleaning is to be performed in that aquatic region. For example, each of the plurality of aquatic regions may be associated with a 'pause cleaning' status. Each of the plurality of aquatic regions may be defined by way of co-ordinate points (e.g. latitude and longitude) and can be different in size. Thus by querying the geographical model 211, 311 with the geographical location of the vessel the monitoring module 206 is able to determine if cleaning is to be performed at the geographical location of the vessel and thus whether the robot is at risk of damage.

An aquatic region may be associated with a 'pause cleaning' status i.e. that cleaning is not to be performed in that region due to a high risk that the robot will be damaged during cleaning when the vessel is located in the aquatic region. For example, the Panama Canal may be associated with the 'pause cleaning' status due to the high risk of damage to the robot 102 caused by colliding with the narrow locks in the canal. In another example, an aquatic region known to have high levels of waste/contamination may be associated with the 'pause cleaning' status due to the high risk of damage to the robot 102 caused by colliding with the waste/contamination.

In yet another example, an aquatic region may be associated with the 'pause cleaning' status due to regulatory reasons e.g. in regions where no cleaning is allowed due to concern with high biocide release from antifouling coating or risk of spreading of non-indigenous species.

The geographical model 211, 311 may indicate that cleaning is to be performed in a particular aquatic region by associating the aquatic region with a 'perform cleaning' status or alternatively by merely not associating the aquatic region with a 'pause cleaning' status. An area of ocean with low levels of waste/contamination is an example aquatic region that may be associated with a 'perform cleaning' status i.e. that cleaning is to be performed in that region due to a low risk that the robot will be damaged during cleaning when the vessel is located in the aquatic region.

In embodiments, the geographical model 211, 311 can be updated such that the status of a particular aquatic region may change over time due to, for example, the amount of waste/contamination in the aquatic region fluctuating.

The frequency by which the geographical location of the vessel is used by the monitoring module 206 to control the cleaning performed by the robot 102 at step S404 and S410 can be controlled in dependence on numerous factors including the type of vessel, speed of the vessel, and the shipping routes of the vessel. Furthermore, as noted above, the frequency by which steps S404 and S410 are performed may not be constant. For example the frequency by which step S404 is performed may increase as a vessel in an aquatic region where cleaning is permitted approaches an aquatic region that is associated with a 'pause cleaning' status. Similarly, the frequency by which step S410 is performed may increase as a vessel in an aquatic region that is associated with a 'pause cleaning' status approaches an aquatic region where cleaning is permitted.

In a second method at step S402 and S408 the monitoring module 206 receives location information defining a location of the robot with respect to the hull of the vessel, and input information that the monitoring module 206 can use to determine, whilst the vessel is stationary, if the vessel will start to move imminently (e.g. within a predetermined time period).

In this method, at step S404 and S410, the monitoring module 206 determines whether the robot is at risk of damage based on the location of the robot on the hull of the vessel and whether the vessel will start to move imminently.

If the monitoring module 206 determines that the vessel will start to move imminently, the monitoring module 206 is configured to make a positive determination that the robot is at risk of damage if the robot is located at one of one or more predetermined locations on the hull of the vessel that are stored in memory (for example if the robot is located on the flat bottom of the hull of the vessel then the robot is at risk of damage in shallow waters when a vessel commences its journey from a port).

The monitoring module 206 may be configured to determine that the vessel will start to move imminently in various ways.

The monitoring module 206 may be configured to determine that the vessel will start to move imminently based on vibration data received from a vibration sensor (e.g. on the robot or on the vessel). In particular the monitoring module 206 may determine that the vessel will start to move imminently based on the intensity of detected vibrations exceeding a predetermined threshold.

The monitoring module 206 may be configured to determine that the vessel will start to move imminently based on an anchor signal received from the anchor sensor 108. The anchor signal indicates that an anchor of the vessel is in a raised or lowered state. Thus, the monitoring module 206 may determine that the vessel will start to move imminently based on the anchor signal indicating that the anchor is in a raised state.

In a third method, at step S402 and S408 the monitoring module 206 receives environmental data relating to an environment of the vessel, and at step S404 and S410 the monitoring module 206 determines whether the robot is at risk of damage based on the environmental data.

The environmental data may comprise a speed of currents in an aquatic environment of the vessel, and at step S404 and S410, the monitoring module 206 may determine that the robot is at risk of damage based on a speed of the currents exceeding a predetermined aquatic current threshold. The predetermined aquatic current threshold may be stored in memory 210 (in embodiments of FIGS. 3a and 3b) or in memory 310 (in the embodiment of FIG. 3c) and the monitoring module 206 may itself compare the speed of the currents to the predetermined aquatic current threshold. Alternatively, the monitoring module 206 may determine that the robot is at risk of damage based on a speed of the currents exceeding a predetermined aquatic current threshold based on receiving a message from a computing device (e.g. the computing device 106 or a computing device on shore (e.g. at a meteorological station)). The predetermined aquatic current threshold may be in the range 0.1-10.0 knots. Preferably the predetermined aquatic current threshold is in the range 2.0-6.0 knots. For example, the predetermined aquatic current threshold may be 6.0 knots.

The environmental data may comprise a temperature (e.g. an air temperature and/or a water temperature), At step S404 and S410, the monitoring module 206 may determine that the robot is at risk of damage based on the temperature being below a predetermined temperature threshold. This predetermined temperature threshold may be in the range −30.0-5.0° C. Preferably this predetermined temperature threshold is in the range −5.0-5.0° C. For example this predetermined temperature threshold may be 0° C. As noted above, low temperatures can lead to ice on the hull 101 of the vessel, ice on the surface of the water or ice on the robot 102 which can be a risk for damaging the robot or causing the robot to become detached from the vessel and lost.

At step S404 and S410, the monitoring module 206 may determine that the robot is at risk of damage based on the temperature being above a predetermined temperature threshold. This predetermined temperature threshold may be in the range 30.0-90.0° C. Preferably this predetermined temperature threshold is in the range 50.0-70.0° C. For example this predetermined temperature threshold may be 60° C. As noted above, high temperatures of metallic surface of the hull 101 may result in damage to components of the robot (e.g. wheel liners, brushes and batteries of the robot).

The predetermined temperature thresholds referred to above may be stored in memory 210 (in embodiments of FIGS. 3a and 3b) or in memory 310 (in the embodiment of FIG. 3c) and the monitoring module 206 may itself compare the temperature to the respective predetermined temperature threshold. Alternatively, the monitoring module 206 may determine that the robot is at risk of damage based on a detected temperature based on receiving a message from a computing device (e.g. the computing device 106 or a computing device on shore (e.g. at a meteorological station)).

The environmental data may comprise wave information relating to the degree of waves in the aquatic environment of the vessel, and at step S404 and S410, the monitoring module 206 may determine that the robot is at risk of damage based on an average wave height exceeding a predetermined wave height threshold. The predetermined wave height threshold may be stored in memory 210 (in embodiments of FIGS. 3a and 3b) or in memory 310 (in the embodiment of FIG. 3c) and the monitoring module 206 may itself compare a determined average wave height to the predetermined wave height threshold. Alternatively, the monitoring module 206 may determine that the robot is at risk of damage based on an average wave height exceeding a predetermined wave height threshold based on receiving a message from a computing device (e.g. the computing device 106 or a computing device on shore (e.g. at a meteorological station)). The predetermined wave height threshold may be in the range 10 cm-10.0 m. Preferably the predetermined wave height threshold is in the range 1.0-3.0 m. For example, the predetermined wave height threshold may be 2 m.

The environmental data may comprise a depth of water below the vessel, and at step S404 and S410, the monitoring module 206 may determine that the robot is at risk of damage based on the depth being below a predetermined depth threshold.

The depth of water below the vessel may be provided by a depth sensor (e.g. acoustic sensor, pressure sensor etc.). The depth sensor may be provided on the vessel or on the robot.

Alternatively, the depth of water below the vessel may be calculated based on the geographical location of the vessel, geographical maps, information about low/high tide and the draft of the vessel. This calculation may be performed by the monitoring module 206 (e.g. on the robot or computing device 106). In embodiments whereby the robot comprises the monitoring module 206, this calculation may be performed on a computing device remote from the robot e.g. computing device 106, and the measurement of the depth of water below the vessel is transmitted to the monitoring module 206. The geographical location of the vessel may be provided, for example, by a location sensor located on the robot or on the vessel.

The predetermined depth threshold may be stored in memory 210 (in embodiments of FIGS. 3a and 3b) or in memory 310 (in the embodiment of FIG. 3c) and the monitoring module 206 may itself compare a determined depth to the predetermined depth threshold. Alternatively, the monitoring module 206 may determine that the robot is at risk of damage based on the depth being below a predetermined depth threshold based on receiving a message from a computing device (e.g. the computing device 106 or a computing device on shore (e.g. at a meteorological station)). The predetermined depth threshold may be in the range 0.3-10.0 m. Preferably the predetermined depth threshold is in the range 0.5-5.0 m. For example, the predetermined depth threshold may be 1.0 m.

As noted above, these methods may be combined. For example according to one aspect of the present disclosure there is provided a method of controlling a robot configured to clean a hull of a vessel whilst travelling over said hull, the method comprising: receiving input data; detecting, based on said input data, at least one of a geographical location of the vessel or environment conditions at said geographical location; during cleaning being performed by the robot, detecting that cleaning being performed by the robot is to be paused based on the geographical location of the vessel and/or the environment conditions at said geographical location; in response to said detecting that cleaning being performed by the robot is to be paused, outputting a pause cleaning signal indicating that said cleaning is to be paused.

Figure 5:
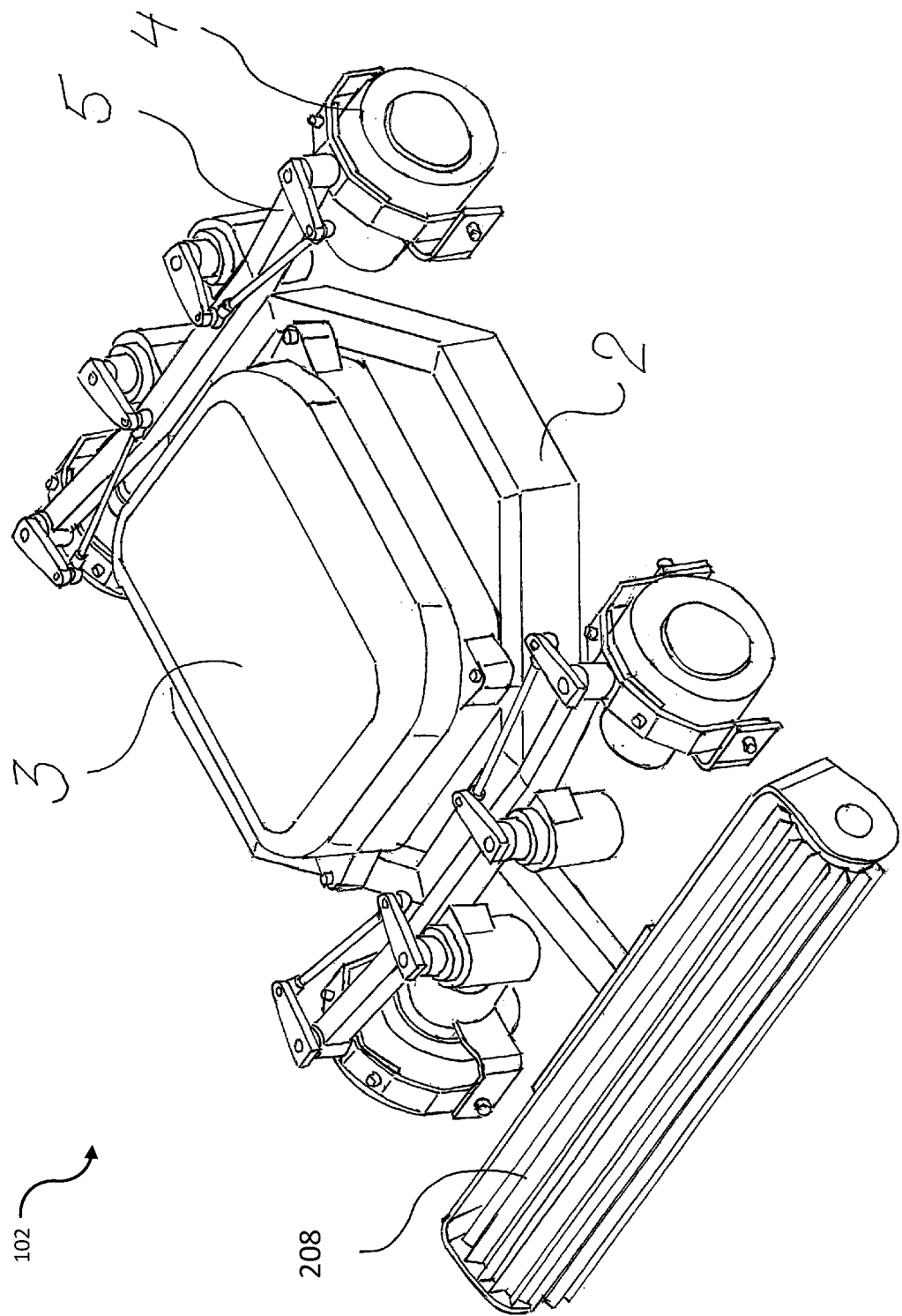
FIG. 5 illustrates an example hull cleaning robot.

FIG. 5 illustrates an example robot 102 for cleaning the painted hulls of marine vessels. The wheels 4 of the robot are magnetic, in order to adhere to ferrous hulls. The robot 102 is driven by the wheels 4, and the wheels 4 are driven by electric motors (not shown). In FIG. 5, the robot 102 is shown fully assembled in a perspective view. The chassis 2 of the robot 1 is a perimeter frame that holds a sealed container 3 that encloses a power supply (e.g. batteries) and one or more of the electrical components shown in FIG. 2. The container 3 is waterproof and sealed to prevent water ingress. Two beam "axles" 5 are fixed to the chassis 2 and these beams 5 support the wheels 4 as well as associated elements of the suspension arrangement and steering mechanisms for the wheels 4. The robot 102 includes the cleaning mechanism 208, which may take the form of a rotary cylindrical brush, and this is also fixed to the chassis 2. The cleaning mechanism 208 is controlled by the cleaning module 204.

It will be appreciated that FIG. 5 shows just one example form that the robot 102 may take and other examples are possible.

Generally, any of the functions described herein can be implemented using software, firmware, hardware (e.g., fixed logic circuitry), or a combination of these implementations. The terms "functionality" and "module" as used herein generally represent software, firmware, hardware, or a combination thereof. In the case of a software implementation, the functionality or module represents program code that performs specified tasks when executed on a processor (e.g. CPU or CPUs). The program code can be stored in one or more computer readable memory device (e.g. memory 210 or memory 310). The features of the techniques described below are platform-independent, meaning that the techniques may be implemented on a variety of commercial computing platforms having a variety of processors.

While the present disclosure has been particularly shown and described with reference to preferred embodiments, it will be understood to those skilled in the art that various changes in form and detail may be made without departing from the scope of the present disclosure as defined by the appendant claims.

The invention claimed is:

1. A method of controlling a robot configured to clean a hull of a vessel whilst travelling over said hull, the method comprising:
    receiving input data;
    during cleaning being performed by the robot, detecting that said cleaning being performed by the robot is to be paused based on determining, from the input data, that the robot is at risk of damage;
    in response to said detecting that cleaning being performed by the robot is to be paused, causing the robot to move to a location on the vessel and outputting, by a processor of the robot, a pause cleaning signal indicating that said cleaning is to be paused to a cleaning module of the robot;
    receiving further input data;
    determining from the further input data, while said cleaning performed by the robot is paused, that the robot is no longer at risk of damage;
    based on said determining that the robot is no longer at risk of damage, detecting that cleaning performed by the robot is to be restarted; and
    in response to said detecting that cleaning being performed by the robot is to be restarted, outputting, by the processor, a restart cleaning signal indicating that said cleaning is to be restarted to the cleaning module.

2. The method of claim 1, wherein the input data comprises location information defining a geographical location of the vessel and the method comprises determining that the robot is at risk of damage based on the location information.

3. The method of claim 2, wherein the method comprising:
    querying a geographical model with the geographical location of the vessel; and
    determining that the robot is at risk of damage based on the geographical model defining that no cleaning is to be performed at said geographical location of the vessel.

4. The method of claim 1, wherein the input data comprises location information defining a location of the robot on the hull of the vessel, the method comprising:
    determining, whilst the vessel is stationary, that the vessel will start to move within a predetermined time period; and
    determining that the robot is at risk of damage based on the location of the robot on the hull of the vessel and said determining that the vessel will start to move within the predetermined time period.

5. The method of claim 4, wherein the input data comprises an indication that an anchor of the vessel is in a raised state, and said determining that the vessel will start to move within the predetermined time period is based on said indication.

6. The method of claim 4, wherein the input data comprises vibration data indicative of an operating state of an engine of the vessel, and said determining that the vessel will start to move within the predetermined time period is based on said vibration data.

7. The method of claim 1, wherein the input data comprises environmental data relating to an environment of the vessel, and the method comprises determining that the robot is at risk of damage based on the environmental data.

8. The method of claim 7, wherein the environmental data comprises a speed of currents in an aquatic environment of the vessel, and the method comprises determining that the robot is at risk of damage based on the speed of the currents exceeding a predetermined aquatic current threshold.

9. The method of claim 7, wherein the environmental data comprises a temperature, and the method comprises determining that the robot is at risk of damage based on the temperature being below a predetermined temperature threshold.

10. The method of claim 7, wherein the environmental data comprises a temperature, and the method comprises determining that the robot is at risk of damage based on the temperature being above a predetermined temperature threshold.

11. The method of claim 7, wherein the environmental data comprises wave information and the method comprises determining that the robot is at risk of damage based on an average wave height exceeding a predetermined wave height threshold.

12. The method of claim 7, wherein the environmental data comprises a depth of water below the vessel, and the method comprises determining that the robot is at risk of damage based on the depth being below a predetermined depth threshold.

13. The method of claim 1, wherein the method is performed by a monitoring module on said robot, and wherein upon detecting that cleaning being performed by the robot is to be paused, the method comprises outputting the pause cleaning signal to the cleaning module on the robot to pause said cleaning; and upon detecting that cleaning performed by the robot is to be restarted, the method comprises outputting a restart cleaning signal to the cleaning module on the robot to restart said cleaning.

14. The method of claim 1, wherein the method is performed by a monitoring module on said robot, and wherein upon detecting that cleaning being performed by the robot is to be paused, the method comprises outputting the pause cleaning signal to a remote computing device external to said robot for validation by a user before transmitting the pause cleaning signal to the cleaning module on the robot; and upon detecting that cleaning performed by the robot is to be restarted, the method comprises outputting a restart cleaning signal to the remote computing device external to said robot for validation by the user before transmitting the restart cleaning signal to the cleaning module on the robot.

15. The method of claim 1, wherein the method is performed by a monitoring module on a remote computing device external to said robot.

16. The method of claim 15, wherein upon detecting that cleaning being performed by the robot is to be paused, the method comprises automatically transmitting the pause cleaning signal to the cleaning module on the robot to pause said cleaning; and upon detecting that cleaning performed by the robot is to be restarted, the method comprises automatically transmitting the restart cleaning signal to the cleaning module on the robot to restart said cleaning.

17. The method of claim 15, wherein upon detecting that cleaning being performed by the robot is to be paused, the method comprises outputting the pause cleaning signal to a user for validation before transmitting the pause cleaning signal to the cleaning module on the robot to pause said cleaning; and upon detecting that cleaning performed by the robot is to be restarted, the method comprises outputting the restart cleaning signal to a user for validation before transmitting the restart cleaning signal to the cleaning module on the robot to restart said cleaning.

18. A computer-readable storage medium comprising instructions which, when executed by a processor, cause the processor to carry out the method of claim 1.

19. A robot configured to clean a hull of a vessel whilst travelling over said hull, the robot comprising a processor configured to:
   receive input data;
   during cleaning being performed by the robot, detect that said cleaning being performed by the robot is to be paused based on determining, from the input data, that the robot is at risk of damage;
   in response to said detecting that cleaning being performed by the robot is to be paused, cause the robot to move to a location on the vessel and output a pause cleaning signal indicating that said cleaning is to be paused to a cleaning module of the robot;
   receive further input data;
   determine from the further input data, while said cleaning performed by the robot is paused, that the robot is no longer at risk of damage;
   based on said determining that the robot is no longer at risk of damage, detect that cleaning performed by the robot is to be restarted; and
   in response to said detection that cleaning being performed by the robot is to be restarted, output a restart cleaning signal indicating that said cleaning is to be restarted to the cleaning module.

\* \* \* \* \*